(12) United States Patent
Gilg et al.

(10) Patent No.: US 7,834,939 B2
(45) Date of Patent: Nov. 16, 2010

(54) CONTINUOUS USE DISPLAY SYSTEM

(75) Inventors: Thomas J. Gilg, Corvallis, OR (US); Aloke Gupta, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1199 days.

(21) Appl. No.: 11/447,383

(22) Filed: Jun. 5, 2006

(65) Prior Publication Data

US 2007/0279522 A1 Dec. 6, 2007

(51) Int. Cl.
*H04N 9/31* (2006.01)
*H04N 9/12* (2006.01)
(52) U.S. Cl. .................................. 348/744; 348/750
(58) Field of Classification Search ................. 348/739, 348/744, 750, 758, 383, 745–747, 806, 807, 348/588–595; 345/589; 353/30, 31; *H04N 9/12, H04N 5/66, 5/64, 9/31, 3/22, 3/23*
See application file for complete search history.

(56) References Cited

U.S. PATENT DOCUMENTS

| | | | |
|---|---|---|---|
| 3,369,452 A | 2/1968 | Grenier | |
| 4,076,399 A | 2/1978 | Schlei | |
| 4,080,637 A | 3/1978 | Chase et al. | |
| 5,602,679 A * | 2/1997 | Dolgoff et al. | 348/744 |
| 5,694,180 A * | 12/1997 | Deter et al. | 348/746 |
| 6,817,718 B2 * | 11/2004 | Katoh | 353/31 |
| 6,883,917 B2 | 4/2005 | Wichner et al. | |

FOREIGN PATENT DOCUMENTS

| | | |
|---|---|---|
| EP | 1347652 | 2/2003 |
| FR | 2084350 | 12/1971 |
| JP | 03239288 | 10/1991 |

OTHER PUBLICATIONS

Majumder, Aditi, Is Spatial Super-Resolution Feasible Using Overlapping Projectors?, Department of Computer Science, University of California, Irvine, US, majumder@ics.uci.edu (date unknown).

* cited by examiner

*Primary Examiner*—Sherrie Hsia

(57) ABSTRACT

One embodiment of a display system includes a first light source that projects a first projected video light to define a first viewable video image, a second light source that projects a second projected video light to define a second viewable video image identical to the first viewable video image wherein the first and second viewable video images together define a displayed video light image, and a controller that fades out projection of the first projected video light and simultaneously fades in projection of the second projected video light such that a light intensity of the displayed video light image remains substantially constant.

19 Claims, 2 Drawing Sheets

CONTINUOUS USE DISPLAY SYSTEM

Display systems may display a viewable image continuously, for example, public signage may be operational twenty four hours a day, 365 days a year. Such continuous use may subject the display system to premature bulb failure and other display subsystem malfunctions. It may be desirable to reduce the failure rate of such display systems while still providing a continuously displayed image.

DETAILED DESCRIPTION OF THE DRAWINGS

Figure 1:
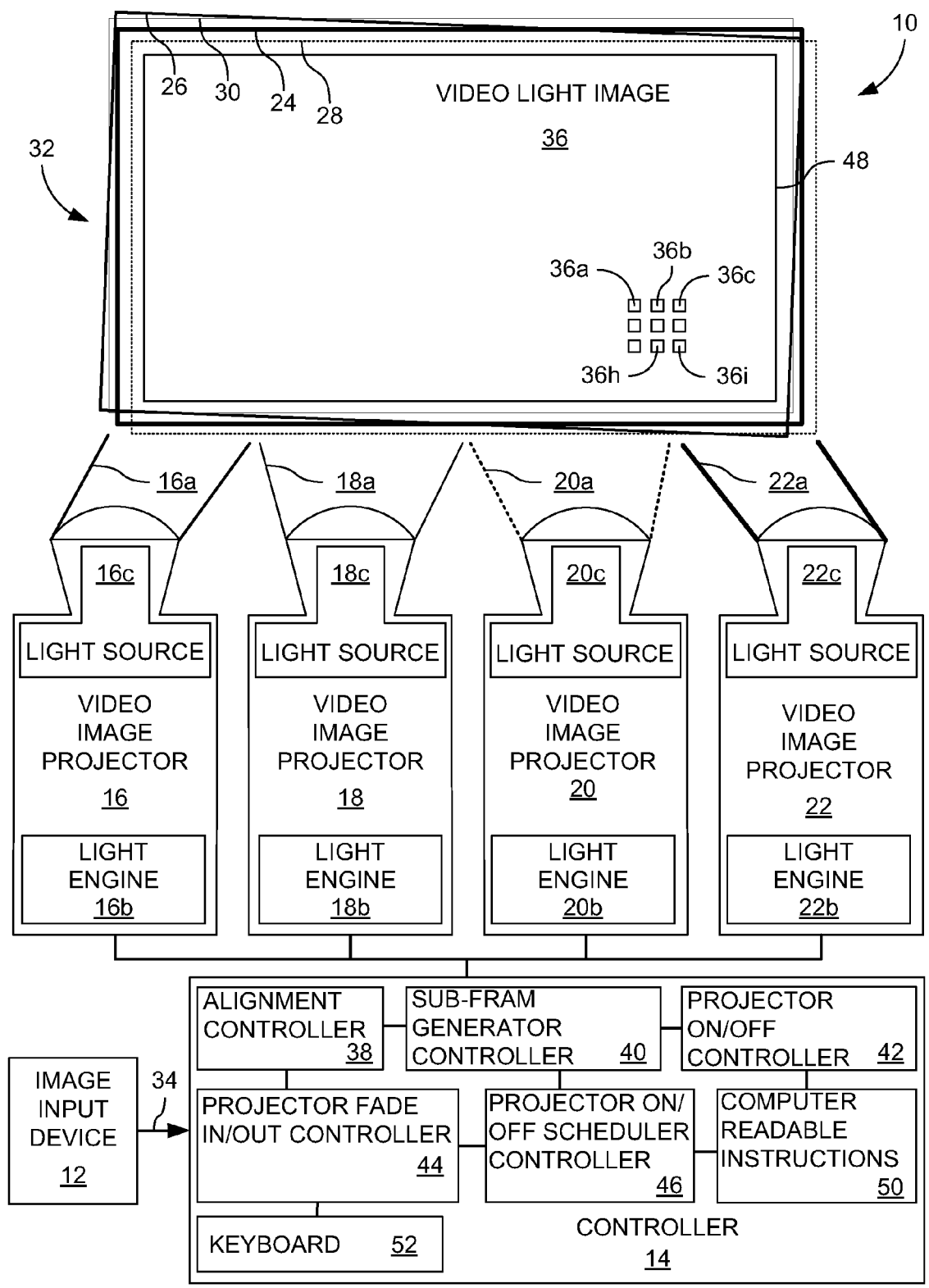
FIG. 1 represents a schematic view of a display system according to one embodiment of the present invention.

FIG. 1 represents a schematic view of a display system 10 according to one embodiment of the present invention. Display system 10 may include an image input device 12 connected to a controller 14. Controller 14 may be connected to two or more projectors. In the embodiment shown, controller 14 is connected to four video image projectors 16, 18, 20 and 22. Each of projectors 16-22 project a light beam, such as a projected video light image 16a, 18a, 20a and 22a, respectively, to form an output image, 24, 26, 28 and 30, respectively, at an image display region, such as a display screen 32. The term video image as used herein means an image other than a slide show, such as a continuous moving picture display, such as a DVD player playing a movie, or a motionless image that may be regenerated, such as a personal computer displaying a motionless login screen or desktop which may be periodically refreshed.

As shown in the embodiment of FIG. 1, projectors 16, 18 and 22 are operational, i.e., are actively projecting a projected video light image to screen 32, whereas projector 20 is resting or in the "off" condition. A light beam 20a and an image 28 that would be projected by projector 20, if projector 20 were working or in the "on" condition, is shown in dash lines. Each of projectors 16-22 may include a light engine 16b-22b, respectively, such as a 150 watt power supply and bulb that can generate 1,500 lumens of light. When one projector is "down" or unpowered, the remaining three projectors may have a combined light output of 4,500 lumens. Four 1,500 lumen light engines may be less expensive to purchase and maintain than a single 4,500-6,000 lumen light engine which may be utilized in a single projector system of the prior art.

Image input device 12 may include any image input device that may function to input image information 34 to controller 14. Image input device 12, for example, may be a digital versatile disc (DVD) player, a cable set top box, a PC, a wireless audio/video device, or the like. Input image information 34 input to controller 14 from image input device 12 generally includes data corresponding to a video image and, upon manipulation by display system 10, corresponds to output images 24, 26, 28 and 30, which may singularly or in combination define a displayed video light image 36 displayed on screen 32.

Image input device 12 may receive or generate input image information 34 continuously, twenty four hours a day, 365 days a year, and may continuously forward image information 34 to controller 14 for continuous display on screen 32 of displayed video light image 36 which corresponds to input image information 34.

Controller 14 may include several components or subsystems such as an alignment controller 38, a sub-frame generator controller 40, a projector on/off controller 42, a projector fade in/out controller 44, and a projector on/off scheduler controller 46. Each of these components or subsystems may be connected to each of the other components or subsystems, as shown schematically by the several connection lines drawn between the schematic boxes. Each of these components will be addressed turn.

Alignment controller 38 may calculate projector or image alignment variables for the system projectors, such as projectors 16-22, and may control projector or image alignment based on such calculated alignment variables. For example, alignment controller 38 may calculate, by any available means, on an individual pixel basis, the position of each of images 24-30 on screen 32. Several pixels 36a-36i of image 36 are shown greatly enlarged for ease of illustration. In one example, controller 38 may be an automatic light sensor device, such as an automated camera system including associated software, that calculates the position of each of images 24-30 on screen 32. The controller 38 may then calculate the pixel-to-pixel relationship between each of the individual images 24-30 projected by projectors 16-22. Controller 38 may then determine the common overlapping region 48 of each of the plurality of images 24-30 projected by the projectors, and the corresponding pixels, i.e., the nearly aligned pixels, of each projected image that are displayed within common overlapping region 48. The terms "nearly aligned" may be utilized herein to describe the pixel alignment because it may be very difficult to have exact physical alignment of individual pixels from multiple projectors on screen 32 due to the sheer number of pixels and due to their extremely small size. Despite the lack of exact physical pixel alignment between every pixel of the multiple projectors on screen 32, controller 38 may produce sub-frames, i.e., projectable pixels, that when melded together on screen 32 may cause a pleasing image to be displayed. The determination of the pixels of each projected image 24-30 displayed within overlapping region 48 allows controller 38 to control each of the pixels projected by each projector to simultaneously display video light image 36 on screen 32. In other words, one or more of projectors 16-22 may each define a nearly identical displayed video light image 36 on the same spot on screen 32 wherein each of the nearly identical displayed video light images displayed on screen 32 are aligned with one another on a nearly pixel-to-pixel basis so as to provide a coherent image and a greater light intensity of image 36 than may be provided by a single projector. The projectors may initially be aligned with one another manually and thereafter the pixel-to-pixel relationship may be calculated and controlled by controller 38.

Sub-frame generator controller 40 may receive input image information 34 from image input device 12 and may generate sub-frame data for each of projectors 16-22. The sub-frame data for each projector 16-22 may correspond to each of projected video light images 16a, 18a, 20a and 22a, respectively, which, when displayed on screen 32, define displayed video light image 36. In other words, each projector 16-22, due to its unique position with respect to screen 32, may be controlled by sub-frame generator controller 40 to project a slightly different projected video light image than the other projectors, wherein each of the slightly different projected video light images 16a-22a corresponds to a slightly different generated sub-frame data set for each projector. Each of the slightly different projected video light images 16a-22a corresponding to the slightly different generated sub-frame data sets for each projector, is projected by projectors 16-22, respectively, and is displayed as identical displayed video light image 36 on screen 32.

On/off controller 42 may control the operational mode of each of projectors 16-22. Controller 42 may be a toggle switch for each projector that moves between the on and off positions for its corresponding projector. In the off mode a projector and its corresponding light source may be turned off and may be unpowered. In FIG. 1 projector 20 is "resting" in the off mode such that its light source 20c is turned off and unpowered. Projectors 16, 18 and 22 are each in the on mode such that their light sources 16c, 18c and 22c, respectively, are turned on and are powered. Powering off of a projector's light source, such as a bulb or a laser for example, for even one hour a day, may dramatically increase the life of the light source when compared to the life of a light source operated continuously twenty four hours a day, 365 days a year without unpowered periods of time. Accordingly, by sequentially powering off each of the projectors of a display system while the other projectors of the system continue to each display identical displayed video light image 36 on screen 32, allows a continuous image to be displayed on screen 32 while allowing each projector of the system to experience some down time or rest time each day. In one embodiment, each of the projectors may be rested for one or more hours each day. In other embodiments, each projector may experience a rest period every hour, every ten hours, every week, every month, and the like. In other words, this "rolling reboot" sequence may continue during all operational hours of the display system such that each projector in turn is rested for a time period while the remaining projectors of the system are functioning.

Fade in/out controller 44 may control the intensity of light projected from each light source 16c-22c such that prior to toggling to the off condition, the output of a "tired" light source may be continuously reduced to the point of no light emission. Simultaneously, a "resting" projector that is toggled to the on condition may have its light source output continuously increased from no light emission to full light emission during a time period which corresponds to the reduction in light intensity of the projector being toggled to the off position. In this manner, one projector may slowly "come on-line" while another projector is slowly taken "off-line" without a noticeable change in intensity of displayed video light image 36. Accordingly, any change in light intensity, if any, of displayed video light image 36 displayed on screen 32 may not be noticeable to the human eye. In one embodiment, fade in/out controller 44 may include a standard electronic dimmer switch. The time period of the fade in or fade out of the individual projectors may be set to be any time period as desired, such as a five second fade time, a fifteen second fade time, a 30 second fade time, a one minute fade time, or the like. In other embodiments, the length of the fade time period may be automatically determined by the controller of the display system based on several different variables. For example, the time period may be determined based on the content and intensity of displayed video light image 36 displayed on screen 32.

On/off scheduler controller 46 may include a set of computer readable instructions 50 that may instruct fade in/out controller 44 and on/off controller 42 when and how to control a particular projector. Controller 46 may allow the input of instructions from an operator on a keyboard 52 such that an operator may manually control the on/off and fade in/out process of the individual projectors of the display system. Such manual operation of the scheduler controller 46 may be desirable during routine and/or emergency maintenance of the display system. During routine use conditions when an operator may not be present, controller 46 may automatically control the on/off and fade in/out functioning of the projectors according to a schedule encoded within computer readable instructions 50. As stated above, the projectors may each sequence through a resting or off condition each hour, each day, each week, or on any schedule as desired.

One advantage of the display system is that each projector is subject to a periodic rest period which has been shown to prolong the life of projector subsystems. Another advantage is that components of the display system may be maintained without subjecting the entire system to downtime, i.e., without a break in continuously displaying an image at a high light intensity. Another advantage of this "rolling reboot" display system is that expensive and exotic continuous use light sources may not be required. Instead, due to a downtime or rest period each day, inexpensive bulbs, utilized in standard on/off light source situations, may be incorporated. Similarly, inexpensive projectors that were not originally designed for continuous display twenty four hours a day, 365 days a year, can be utilized as a subsystem of the display system that provides such continuous display. Another advantage is that smaller light engines may be utilized, one for each projector for example, rather than purchasing a single, large output light engine. The use of multiple, smaller light engines, compared to one large light engine, may allow a less expensive overall purchase price, and may have increased reliability compared to one large light engine.

Figure 2:
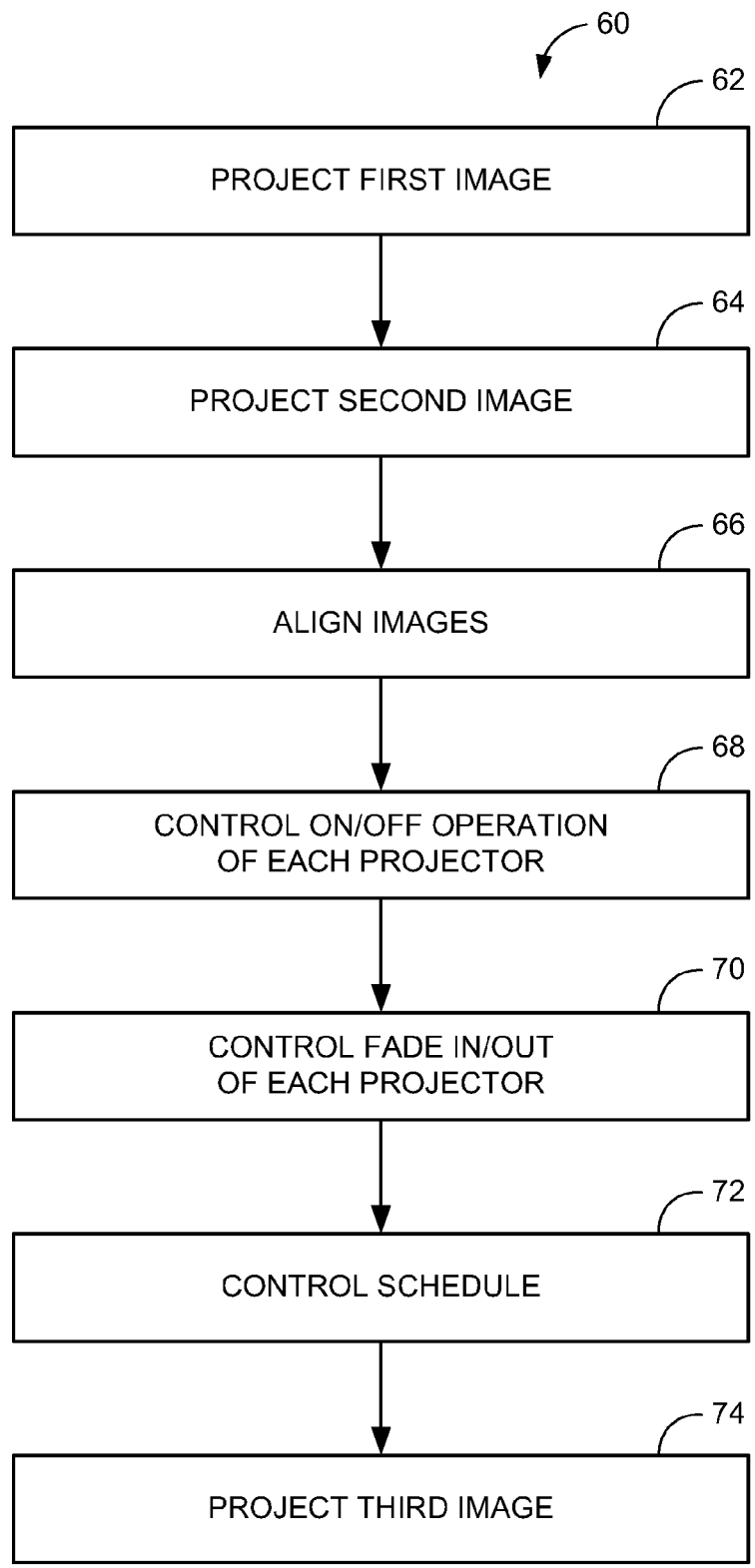
FIG. 2 is a flowchart of a method of using a display system according to one embodiment of the present invention.

FIG. 2 shows a flowchart of one method of using a display system according to one embodiment of the present invention. Method 60 may include a step 62 of projecting a first projected video light image 16a from a first projector 16. Step 64 may include projecting a second projected video light image 18a from a second projector 18. Step 66 may include controlling the first projector 16 and the second projector 18 such that the first projected video light image 16a and the second projected video light image 18b are aligned with one another. Step 68 may include controlling on/off operation of the first projector 16 and the second projector 18 such that each of the first and second projectors alternate through an on-and-off operational sequence during constant projection of a displayed video light image 36 by the system, wherein the on-and-off operational sequence of the first projector 16 is offset with respect to the on-and-off operational sequence of the second projector 18. Step 70 may include reducing a light intensity of the first projector 16 prior to turning projector 16 off, while simultaneously increasing a light intensity of the second projector 18 right after projector 18 is turned on. The reduction of light intensity of projector 16 may correspond to the increase of light intensity of projector 18 such that the total light intensity from the two projectors is substantially constant, as perceived by the human eye, as first projector 16 is turned off and second projector 18 is turned on. Step 72 may include controlling on and off operation of each of the first and second projectors according to a predetermined schedule. Step 74 may include projecting a third projected video light image 20a from a third projector 20, controlling the first, second and third projectors such that the first, second and third projected video light images and are aligned with one another, and controlling on/off operation of the first, second and third projectors such that each of the first, second and third projectors alternate through an on-and-off operational sequence during constant projection of a displayed video light image by the system, wherein the on-and-off operational sequence of each of the first, second and third projectors are offset with respect to one another. Steps 68-72 may be conducted in a loop during projection of an image, after the initial alignment step 66. In other words, alignment step 66 may be part of the continuous loop of the method, or the alignment step 66 may only be conducted when desired, such as at startup or after one or more of the projectors has been disturbed from its aligned position.

The foregoing description of embodiments of the invention have been presented for purposes of illustration and description. It is not intended to be exhaustive or to limit the invention to the precise form disclosed, and modifications and variation are possible in light of the above teachings or may be acquired from practice of the invention. The embodiments were chosen and described in order to explain the principles of the invention and its practical application to enable one skilled in the art to utilize the invention in various embodiments and with various modification as are suited to the particular use contemplated. It is intended that the scope of the invention be defined by the claims appended hereto and their equivalents.

We claim:

1. A display system, comprising:
   a first light source that projects a first projected video light to define a first viewable video image;
   a second light source that projects a second projected video light to define a second viewable video image identical to said first viewable video image wherein said first and second viewable video images together define a displayed video light image; and
   a controller that fades out projection of said first projected video light and simultaneously fades in projection of said second projected video light such that a light intensity of said displayed video light image remains substantially constant.

2. A display system according to claim 1 wherein said first video light and said second video light each contain a plurality of pixels and are each overlapped and aligned on a pixel-to-pixel basis with respect to one another.

3. A display system according to claim 2 wherein said controller includes a sub-frame generator that generates image data for said first light source and said second light source corresponding to said pixel-to-pixel relationship.

4. A display system according to claim 1 wherein said controller includes a light source on/off controller that controls on and off functioning of each of said first light source and said second light source.

5. A display system according to claim 1 wherein said controller includes a light source on/off scheduler that controls, on a predetermined schedule, fade out projection of said first video light and simultaneous fade in projection of said second video light.

6. A display system according to claim 1 further comprising a third light source that projects a third projected video light to define a third viewable video image identical to said first and second viewable video images, wherein said first, second and third viewable video images together define said displayed video light image, wherein said controller fades out projection of one of said first, second and third video lights and simultaneously fades in projection of another one of said first, second and third video lights such that a light intensity of said displayed video light image remains substantially constant and such that two video lights are projected during operation.

7. A display system according to claim 6 further comprising a fourth light source that projects a fourth projected video light to define a fourth viewable video image identical to said first, second and third view video images, wherein said first, second, third and fourth viewable video images together define said displayed video light image, wherein said controller fades out projection of one of said first, second, third and fourth video lights and simultaneously fades in projection of another one of said first, second, third and fourth video lights such that a light intensity of said displayed video light image remains substantially constant, such that three video lights are simultaneously projected during operation of said system and such that each one of said first, second, third and fourth light sources rotate through a rest sequence during operation.

8. A display system according to claim 1 further comprising a first light engine that powers said first light source and a second light engine that powers said second light source, said first light engine operationally separate from said second light engine.

9. A display system according to claim 1 wherein said controller fades out projection of said second projected video light and simultaneously fades in projection of said first projected video light such that a light intensity of said displayed video light image remains substantially constant.

10. A method of using a display system, comprising:
    projecting a first video image from a first projector;
    projecting a second video image from a second projector, wherein said first video image and said second video image are identical and define a displayed video light image on a display region; and
    controlling on/off operation of said first projector and said second projector such that each of said first and second projectors alternate through an on-and-off operational sequence during constant projection of said displayed video light image by said system, wherein said on-and-off operational sequence of said first projector is offset with respect to said on-and-off operational sequence of said second projector.

11. A method according to claim 10 wherein each of said first and second projectors includes a light source and wherein said light source of said first projector is unpowered during an off phase of said on-and-off operational sequence of said first projector and wherein said light source of said second projector is unpowered during an off phase of said on-and-off operational sequence of said second projector.

12. A method according to claim 10 wherein said controlling on/off operation includes controlling fade in of one of said first and second projectors while simultaneously controlling fade out of the other of said first and second projectors such that a light intensity of said displayed video light image of said system remains constant.

13. A method according to claim 10 further comprising:
    projecting a third video image from a third projector, wherein said first, second and third video images are identical and define said displayed video light image on said display region; and
    controlling on/off operation of said first, second and third projectors such that each of said first, second and third projectors alternate through an on-and-off operational sequence during constant projection of said displayed video light image by said system, wherein said on-and-off operational sequence of each of said first, second and third projectors are offset with respect to one another.

14. A method according to claim 10 wherein said first and second projectors are each powered by its own dedicated light engine.

15. A method according to claim 10 wherein said controlling on/off operation includes controlling on and off operation of each of said first and second projectors according to a predetermined schedule.

16. A control system for controlling a display system that includes at least two video projectors that each project an identical video image to define a displayed video image on a display region, comprising computer operable instructions that control on and off operation of said at least two video projectors such that one of said at least two video projectors is on while another of said at least two video projectors is off, and such that an intensity of said displayed video image displayed on said display region remains constant.

17. A control system according to claim 16 further comprising computer operable instructions that schedule on and off operational control of said at least two video projectors such that each of said at least two video projectors turn on and off according to a predetermined schedule.

18. A control system according to claim 16 further comprising computer operable instructions that control fade in and fade out operation of said at least two video projectors such that one of said at least two video projectors fades out while simultaneously another of said at least two video projectors fades in such that an intensity of said displayed video image displayed on said display region remains constant.

19. A control system according to claim 16 wherein said computer operable instructions that control on and off operation of said at least two video projectors facilitate a rest period for each of said at least two video projectors during constant operation of said display system.

* * * * *